(12) United States Patent
Pacheco et al.

(10) Patent No.: US 10,543,923 B2
(45) Date of Patent: Jan. 28, 2020

(54) SEAT BACKREST

(71) Applicant: AMI INDUSTRIES, INC., Colorado Springs, CO (US)

(72) Inventors: Chad R. Pacheco, Colorado Springs, CO (US); Kyler Marutzky, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 210 days.

(21) Appl. No.: 15/823,941

(22) Filed: Nov. 28, 2017

(65) Prior Publication Data

US 2019/0161194 A1    May 30, 2019

(51) Int. Cl.
    *B64D 11/06*    (2006.01)
(52) U.S. Cl.
    CPC ...... *B64D 11/0691* (2014.12); *B64D 11/0639* (2014.12); *B64D 11/062* (2014.12)
(58) Field of Classification Search
    None
    See application file for complete search history.

(56) References Cited

U.S. PATENT DOCUMENTS

| 4,452,486 A * | 6/1984 | Zapf | A47C 1/032 |
| | | | 297/317 |
| 4,993,666 A | 2/1991 | Baymak et al. | |
| 7,654,602 B2 * | 2/2010 | Smiley | B60N 2/2209 |
| | | | 296/65.01 |
| 9,308,836 B2 * | 4/2016 | Hausler | B60N 2/2209 |
| 9,403,597 B2 | 8/2016 | Bermes | |
| 2009/0188100 A1 * | 7/2009 | Durney | B32B 1/00 |
| | | | 29/469 |
| 2014/0319275 A1 * | 10/2014 | Najd et al. | B64D 11/02 |
| | | | 244/118.6 |
| 2015/0008709 A1 | 1/2015 | Erhel | |
| 2016/0376007 A1 | 12/2016 | Meindlhumer | |

FOREIGN PATENT DOCUMENTS

| EP | 0353210 | | 1/1990 |
| GB | 2563051 A | * | 5/2018 |
| WO | 2012075297 | | 6/2012 |

OTHER PUBLICATIONS

European Patent Office, European Search Report dated Apr. 5, 2019 in Application No. 18207338.7.

* cited by examiner

*Primary Examiner* — Sarah B McPartlin
(74) *Attorney, Agent, or Firm* — Snell & Wilmer, L.L.P.

(57) ABSTRACT

A seat is disclosed. The seat includes a frame, a seat pan connected to the frame and a backrest. The backrest includes a main panel, an upper panel hingedly connected to the main panel and a lower panel hingedly connected to the main panel. The upper panel is connected to the frame and the lower panel is connected to the seat pan.

13 Claims, 5 Drawing Sheets

SEAT BACKREST

FIELD

The present disclosure relates to jumpseats and, more particularly, to a retractable jumpseat having a flexible backrest for use in an aircraft cabin.

BACKGROUND

Aircraft cabin seats (also referred to as stowable seats or jump seats) are used for flight attendant safety and comfort during taxi, takeoff, landing and inflight periods of rest. Aircraft cabin seats may be used for long periods of time depending on flight duration. Traditional cabin seats may cause pain or discomfort for the crew member occupying the seat due to the non-ergonomic geometry of the seat. Further, the space available for extending a cabin seat into a more comfortable position may be minimal, as useable volumetric space on an aircraft tends to be limited and the cabin seats should not hinder ingress and egress for passengers in the event of an emergency.

SUMMARY

A seat having a backrest is disclosed. In various embodiments, the seat includes a base frame, a seat pan connected to the base frame and a backrest having a main panel, an upper panel hingedly connected to the main panel and a lower panel hingedly connected to the main panel. In various embodiments, the upper panel is further connected to the base frame and the lower panel is further connected to the seat pan.

In various embodiments, a first hinge connects the main panel to the upper panel, a second hinge connects the main panel to the lower panel and a third hinge connects the upper panel to the base frame. The lower panel may also be connected to the seat pan. In various embodiments, the seat pan is secured to a seat frame pivotally mounted to the base frame. In various embodiments, the seat frame includes a hook member configured to engage a stop member on the base frame. In various embodiments, the main panel comprises a laminate structure. The main panel may also comprise a plurality of apertures.

In various embodiments, the lower panel comprises an aperture configured to receive a fastener. In various embodiments, the aperture is a slotted aperture, configured for positional adjustment of the lower panel with respect to the seat pan. In various embodiments, the base frame includes a cross member and the third hinge is configured for connection to the cross member using a first plurality of removable fasteners. In various embodiments, the lower panel is configured for connection to the seat pan using a second plurality of removable fasteners. The lower panel may also comprise a plurality of apertures configured to receive the second plurality of removable fasteners. In various embodiments, the apertures are slotted apertures, configured for positional adjustment of the lower panel with respect to the seat frame.

A backrest for a jumpseat is disclosed. In various embodiments, the backrest includes a main panel, an upper panel hingedly connected to the main panel by a first hinge and a lower panel hingedly connected to the main panel by a second hinge. In various embodiments, the upper panel is configured for hinged connection to a base frame of the jumpseat and the lower panel is configured for connection to a seat frame of the jumpseat. In various embodiments, the main panel includes a layer of sheet metal.

In various embodiments, the upper panel includes a third hinge configured for connection to the frame of the jumpseat. In various embodiments, the lower panel includes a plurality of apertures configured to receive a plurality of removable fasteners. In various embodiments, the apertures are slotted apertures, configured for positional adjustment of the lower panel with respect to the seat frame. In various embodiments, the main panel comprises a plurality of interior apertures.

A jumpseat is disclosed. In various embodiments, the jumpseat includes a housing having a front surface, a seat pan configured for pivotal retraction within the housing, such that a lower surface of the seat pan is flush with the front surface of the housing while the seat pan is in the retracted position and a backrest having a main panel, an upper panel hingedly connected to the main panel and a lower panel hingedly connected to the main panel, the upper panel further connected to the frame and the lower panel further connected to the seat pan. In various embodiments, the upper panel is configured for removable connection to the housing and the lower panel is configured for removable connection to the seat pan.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined. As used herein, "distal" refers to the direction outward, or generally, away from a reference component. As used herein, "proximal" or "proximate" refer to a direction inward, or generally, towards the reference component.

Figure 1:
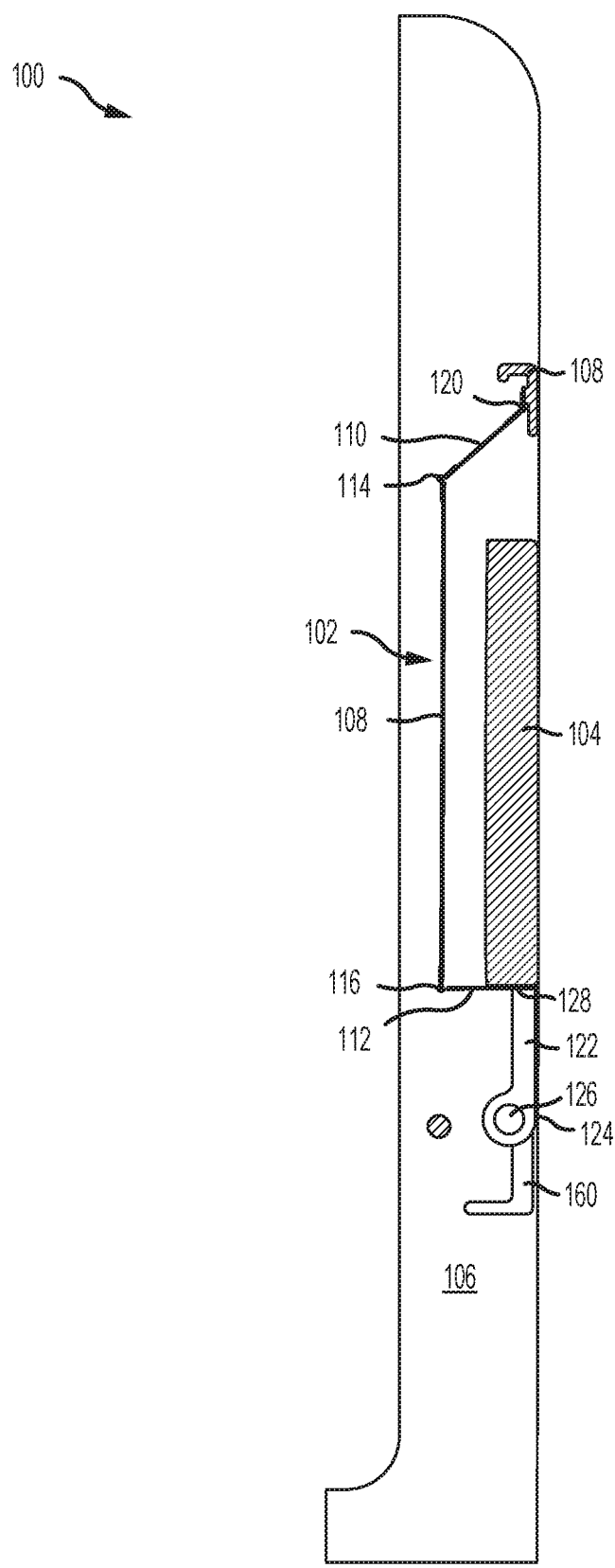
FIG. 1 illustrates a side view of an aircraft jumpseat in a retracted position, in accordance with various embodiments.

Referring now to the drawings, FIG. 1 illustrates a side view of a jumpseat 100 in a retracted position, in accordance with various embodiments. The jumpseat 100 includes a backrest 102 and a seat pan 104. A housing or base frame 106 provides structural support for the backrest 102 and the seat pan 104, as well as other components. As discussed further below, the backrest 102 includes a main panel 108, an upper panel 110 and a lower panel 112. In various embodiments, the main panel 108 and the upper panel 110 are connected by a first hinge 114 and the main panel 108 and the lower panel 112 are connected by a second hinge 116. An upper cross member 118 is connected to the base frame 106 and provides a mount for connecting the upper panel 110. The upper panel 110 is connected to the upper cross member 118 by a third hinge 120. In various embodiments, the seat pan 104 may be secured to a seat frame 122 that includes a central portion 124 connected to the base frame 106 by a pivot assembly 126. In various embodiments, the seat pan 104 may be integral with the seat frame 122. The seat pan 104 further includes an attachment portion 128 that is connected to the lower panel 112. A hook member 160 extends in a direction opposite the seat pan 104, with the pivot assembly 126 being disposed intermediate the seat pan 104 and the hook member 160, and is configured to engage a stop member 162 when the seat pan 104 is rotated to assume a deployed position. The hook member 160 and stop member 162 are positioned relative to one another to stop rotation of the seat pan 104 prior to the backrest 102 taking the full load of a user when the jumpseat 100 is placed in a deployed position.

Figure 2A:
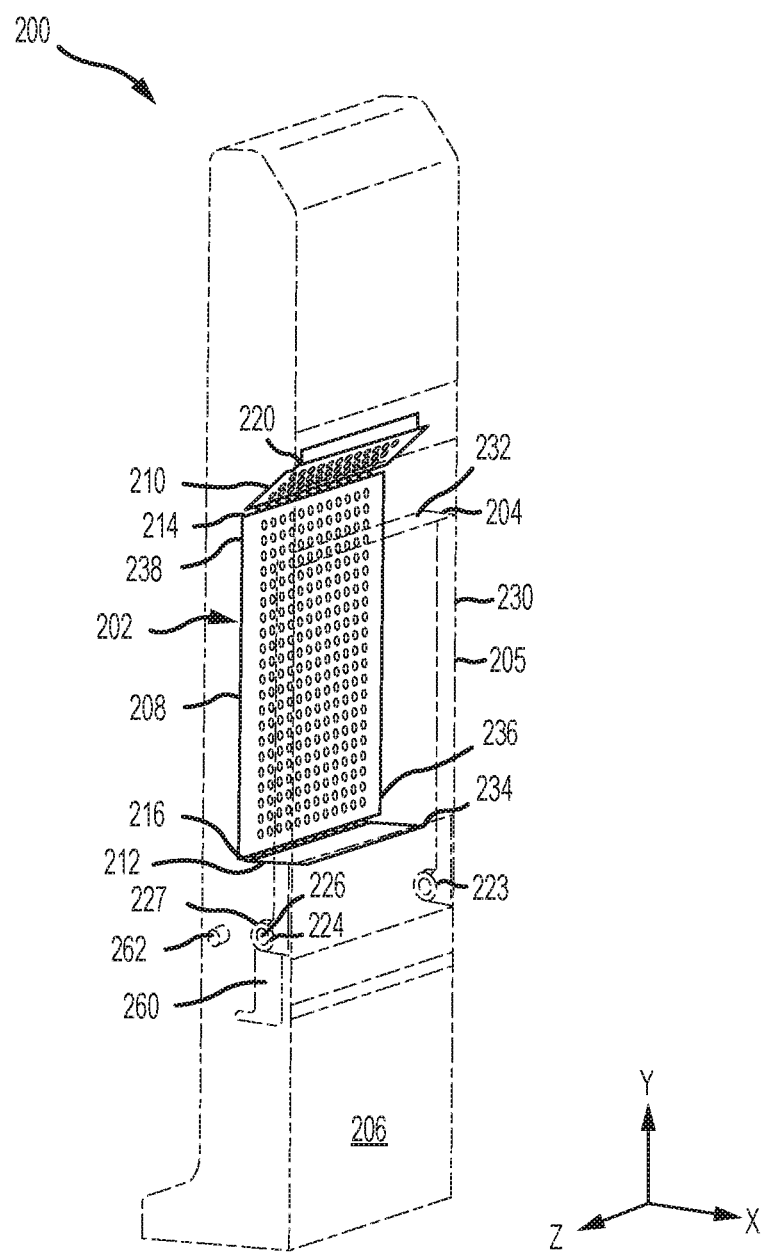
FIG. 2A is a perspective view of an aircraft jumpseat in a retracted position.
Figure 2B:
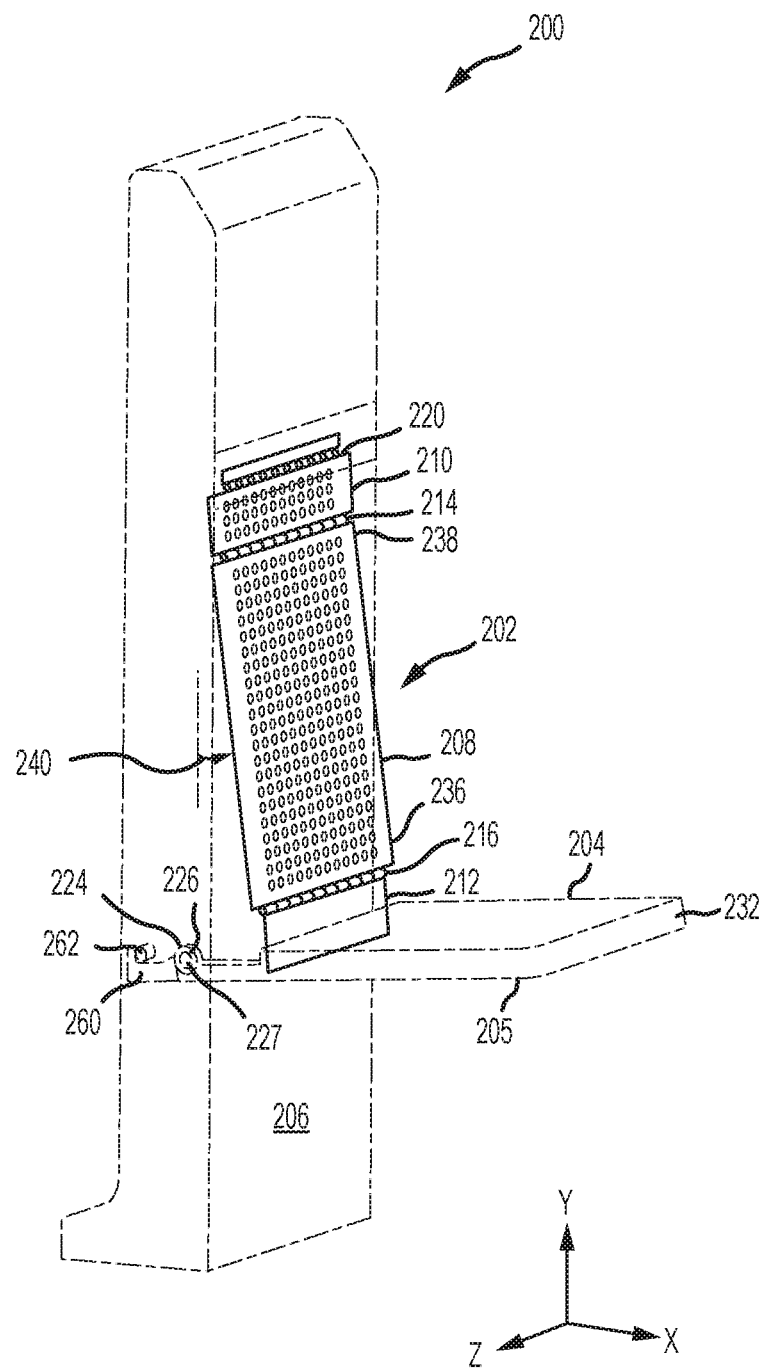
FIG. 2B is a perspective view of an aircraft jumpseat in a deployed position.

Referring now to FIGS. 2A and 2B, perspective views of a jumpseat 200 in accordance with various embodiments are illustrated in a retracted position and a deployed position, respectively. Similar to the above description, the jumpseat 200 includes a backrest 202 and a seat pan 204. A housing or base frame 206 provides structural support for the backrest 202 and the seat pan 204 and other components associated with the jumpseat 200. A pivot assembly 226 enables the seat pan 204 to pivot from the retracted position, as shown in FIG. 2A, to the deployed position, as shown in FIG. 2B. In various embodiments, the pivot assembly 226 may comprise a pin positioned on either side of the base frame 206 coupled to an aperture 223 extending through each proximal end 224 of the seat frame 222. The backrest 202 includes a main panel 208, an upper panel 210 and a lower panel 212. In various embodiments, the panels are hingedly connected to one another and to the base frame 206 by a first hinge 214, a second hinge 216 and a third hinge 220.

As is apparent from FIGS. 2A and 2B, while in the retracted position, the seat pan 204 is disposed within the housing or base frame 206. In various embodiments, the seat pan 204 includes a lower portion 205 that is flush with a front surface 230 of the housing or base frame 206 while in the retracted position. Further, referring to the xyz coordinate system, the seat pan 204 lies in a plane substantially parallel with the yz-plane while in the retracted position. The seat pan 204 is switched to the deployed position by rotating outward and downward a distal end 232 of the seat pan 204 about the pivot assembly 226. Referring to the xyz coordinate system, the seat pan 204 lies in a plane substantially parallel with the xz-plane while in the deployed position. As the seat pan 204 is rotated from the retracted position toward the deployed position, the lower panel 212, which is fixedly attached to a rear portion 234 of the seat pan 204, rotates with the seat pan 204. As the lower panel 212 rotates with the seat pan 204, a lower portion 236 of the main panel 208 translates first outward from the housing or base frame 206, in a direction substantially along the x-axis, and then downward. During the downward portion of rotation, an upper portion 238 of the main panel 208, connected to the upper panel 210 by the first hinge 214, urges the upper panel 210 to rotate about the third hinge 220 into a substantially vertical position, as illustrated in FIG. 2B, together with the main panel 208. The sequence of actions is reversed when switching the seat pan 204 from the deployed position shown in FIG. 2B to the retracted position shown in FIG. 2A. While in the deployed position, the backrest 202 of the jumpseat 200 assumes a position that is slightly angled with respect to the front surface 230 of the housing or base frame 206. In various embodiments, an angle 240 between a plane extending through the main panel 208 and the yz-plane lies within a range of from about 10 degrees to about 30 degrees. In various embodiments, the angle 240 is about 20 degrees. As described above, the seat pan 204 includes a hook member 260 configured to engage a stop member 262 when the seat pan 204 is rotated toward a deployed position. The hook member 260 and stop member 262 are positioned relative to one another to stop rotation of the seat pan 204 prior to the backrest 202 taking the full load of a user when the jumpseat 200 is placed in a deployed position.

Figure 3:
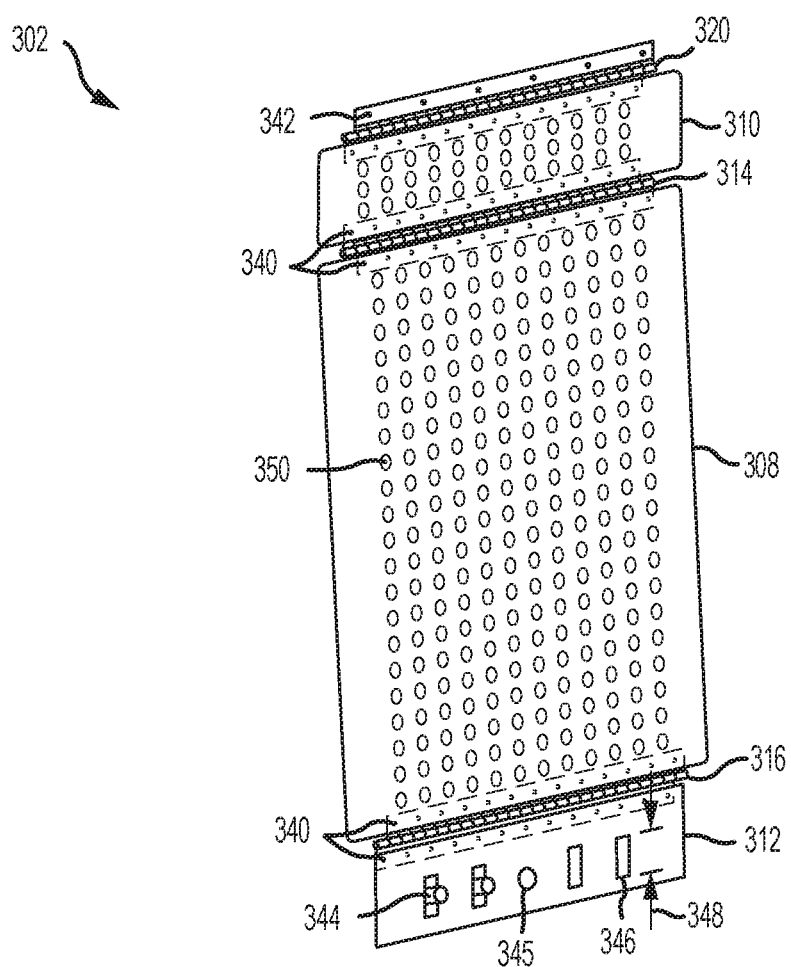
FIG. 3 is a perspective view of a backrest for use in aircraft jumpseat.

Referring now to FIG. 3, a perspective view of a backrest 302 used in a jumpseat is illustrated according to various embodiments. Similar to the description above, the backrest 302 includes a main panel 308, an upper panel 310 and a lower panel 312. In various embodiments, the main panel 308 and the upper panel 310 are connected by a first hinge 314 and the main panel 308 and the lower panel 312 are connected by a second hinge 316. According to various embodiments, a third hinge 320 connects the upper panel 310 to a cross member that is itself connected to or made integral with a frame for the jumpseat. The hinges connecting the panels may be connected to the panels using any suitable manner of connection, such as by welding or brazing or with fasteners, such as rivets, screws or bolts. In various embodiments, the first hinge 314 is connected to the main panel 308 and the upper panel 310 using a plurality of fasteners 340 spaced along a width of the panels. Similarly, the second hinge 316 is connected to the main panel 308 and the lower panel 312 using a plurality of fasteners 340 spaced along the width of the panels. The third hinge 320 may be connected to the upper panel 310 using similar techniques.

In various embodiments, the third hinge 320 is connected to the cross member or frame using a second plurality of fasteners 342. In various embodiments, the second plurality of fasteners 342 is removable, such as with bolts, thereby allowing replacement of the backrest 302 in a jumpseat previously in service. In various embodiments, the lower panel 312 is connected to a seat pan using one or more fasteners 344, which may also be removable. The fasteners 344 extend through one or more apertures 345 positioned in the lower panel 312 for securing the lower panel to the seat pan. In various embodiments, the apertures 345 may have a circular shape sized to receive one of the fasteners 344, such as a pin or a bolt. In various embodiments, the apertures 345 are elongated to form slotted apertures 346 having a length 348. In various embodiments, the length 348 of the slotted apertures 346 enable the backrest 302 to be adjustably mounted within a jumpseat, such that the angle at which the backrest 302 is positioned with respect to the housing or frame or the lengthwise tension experienced by the backrest 302 while in the deployed position may be adjusted.

In various embodiments, the components of the backrest 302, such as the main panel 308, may be constructed using sheet metal or similar materials. In various embodiments, the various components of the backrest 302 may be constructed of sheets of aluminum or stainless steel. Such materials permit the panels in the backrest 302 to flex and conform to the shape of a user while seated. In various embodiments, one or more panels of the backrest 302, such as the main panel 308, may be constructed using a laminated structure of sheet metal or similar materials. In various embodiments, one or more of the panels of the backrest 302, such as the main panel 308 or the upper panel 310, may include a plurality of interior apertures 350. The plurality of interior apertures 350 permit additional flexibility of the backrest to conform to the shape of a user and reduce weight.

Figure 4:
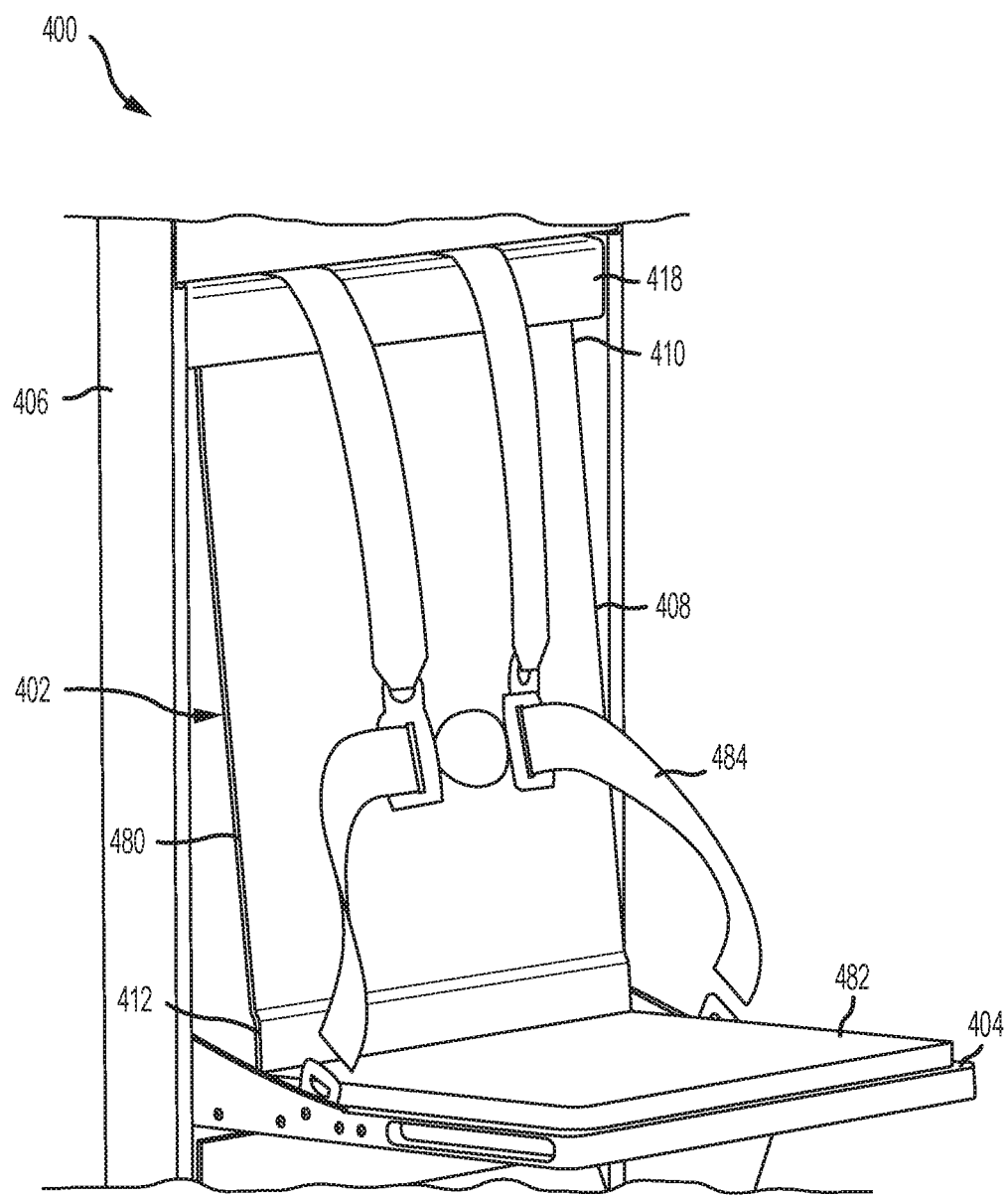
FIG. 4 is a perspective view of an aircraft jumpseat in a deployed position.

Referring now to FIG. 4, a jumpseat 400 is illustrated in accordance with various embodiments in a deployed position. The jumpseat 400 includes a backrest 402 and a seat pan 404. A housing or base frame 406 provides structural support for the backrest 402 and the seat pan 404, as well as other components. In various embodiments, the backrest 402 includes one or more of the embodiments described above and may include a main panel 408, an upper panel 410 and a lower panel 412. In various embodiments, the main panel 408 and the upper panel 410 are connected by a first hinge and the main panel and the lower panel are connected by a second hinge. An upper cross member 418 is connected to the housing or base frame 406 and provides a mount for connecting the upper panel 410. The upper panel 410 may be connected to the upper cross member 418 by a third hinge. In various embodiments, the backrest 402 includes a covering 480. The covering 480 may be constructed of any suitable material used for cushioning seats and serves to both provide additional comfort to a user and to hide the various hinges and apertures above described. A seat portion 482 may also be included for additional comfort. A belt system 484 may also be incorporated into the jumpseat 400 in a conventional manner.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A seat, comprising:
   a base frame;
   a seat pan connected to the base frame; and
   a backrest having a main panel, an upper panel hingedly connected to the main panel and a lower panel hingedly connected to the main panel, the upper panel further connected to the base frame and the lower panel further connected to the seat pan;
   a first hinge connecting the main panel to the upper panel;
   a second hinge connecting the main panel to the lower panel;
   a third hinge connecting the upper panel to the base frame;
   wherein the lower panel is connected to the seat pan, the seat pan is secured to a seat frame pivotally mounted to the base frame and the lower panel comprises an aperture configured to receive a fastener to secure the lower panel with respect to the seat pan.

2. The seat of claim 1, wherein the seat frame includes a hook member configured to engage a stop member on the base frame.

3. The seat of claim 1, wherein the main panel comprises a laminate structure.

4. The seat of claim 1, wherein the main panel comprises a plurality of interior apertures.

5. The seat of claim 1, wherein the base frame includes a cross member and wherein the third hinge is configured for connection to the cross member using a first plurality of removable fasteners.

6. The seat of claim 5, wherein the lower panel is configured for connection to the seat pan using a second plurality of removable fasteners.

7. The seat of claim 6, wherein the lower panel comprises a plurality of slotted apertures configured to receive the second plurality of removable fasteners and wherein the slotted apertures are configured for positional adjustment of the lower panel with respect to the seat frame.

8. A backrest for a jumpseat, comprising:
a main panel;
an upper panel hingedly connected to the main panel by a first hinge; and
a lower panel hingedly connected to the main panel by a second hinge,
  wherein the upper panel is configured for hinged connection to a base frame of the jumpseat and the lower panel is configured for connection to a seat frame of the jumpseat and
  wherein the lower panel includes a plurality of slotted apertures configured to receive a plurality of removable fasteners and the plurality of slotted apertures is configured for positional adjustment of the lower panel with respect to the seat frame.

9. The backrest of claim 8, wherein the main panel includes a layer of sheet metal.

10. The backrest of claim 8, wherein the upper panel includes a third hinge configured for connection to the base frame of the jumpseat.

11. The backrest of claim 8, wherein the main panel comprises a plurality of interior apertures.

12. A jumpseat, comprising
a housing having a front surface;
a seat pan configured for pivotal retraction within the housing, such that a lower surface of the seat pan is flush with the front surface of the housing while the seat pan is in a retracted position; and
a backrest having a main panel, an upper panel hingedly connected to the main panel and a lower panel hingedly connected to the main panel, the upper panel further hingedly connected to the housing and the lower panel further hingedly connected to the seat pan,
  wherein the lower panel includes a plurality of slotted apertures configured to receive a plurality of removable fasteners and the plurality of slotted apertures is configured for positional adjustment of the lower panel with respect to the seat frame.

13. The jumpseat of claim 12, wherein the upper panel is configured for removable connection to the housing and wherein the lower panel is configured for removable connection to the seat pan.

* * * * *